Sept. 15, 1942. K. C. SLAMP 2,296,065
HAY RAKE
Filed Dec. 10, 1941 3 Sheets-Sheet 3

Inventor
Kenneth C. Slamp,

By Clarence A. O'Brien

Attorney

Patented Sept. 15, 1942

2,296,065

UNITED STATES PATENT OFFICE 2,296,065

HAY RAKE

Kenneth C. Slamp, Davis, Ill.

Application December 10, 1941, Serial No. 422,431

1 Claim. (Cl. 56—27)

The present invention relates generally to new and useful improvements in rotary hay rakes of the side delivery type and has for its primary object to provide, in a manner as hereinafter set forth, an implement of this character which operates ahead or in front of a tractor and which is driven from the usual power take-off of said tractor.

Another very important object of the invention is to provide a side delivery hay rake of the aforementioned character comprising novel means for floatingly mounting said rake on the front of the tractor.

Other objects of the invention are to provide a side delivery hay rake of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 6 is a cross sectional view, taken substantially on the line 6—6 of Figure 4.

Figure 7 is a detail view in horizontal section through the gear connection constituting a part of the drive.

Figure 1:
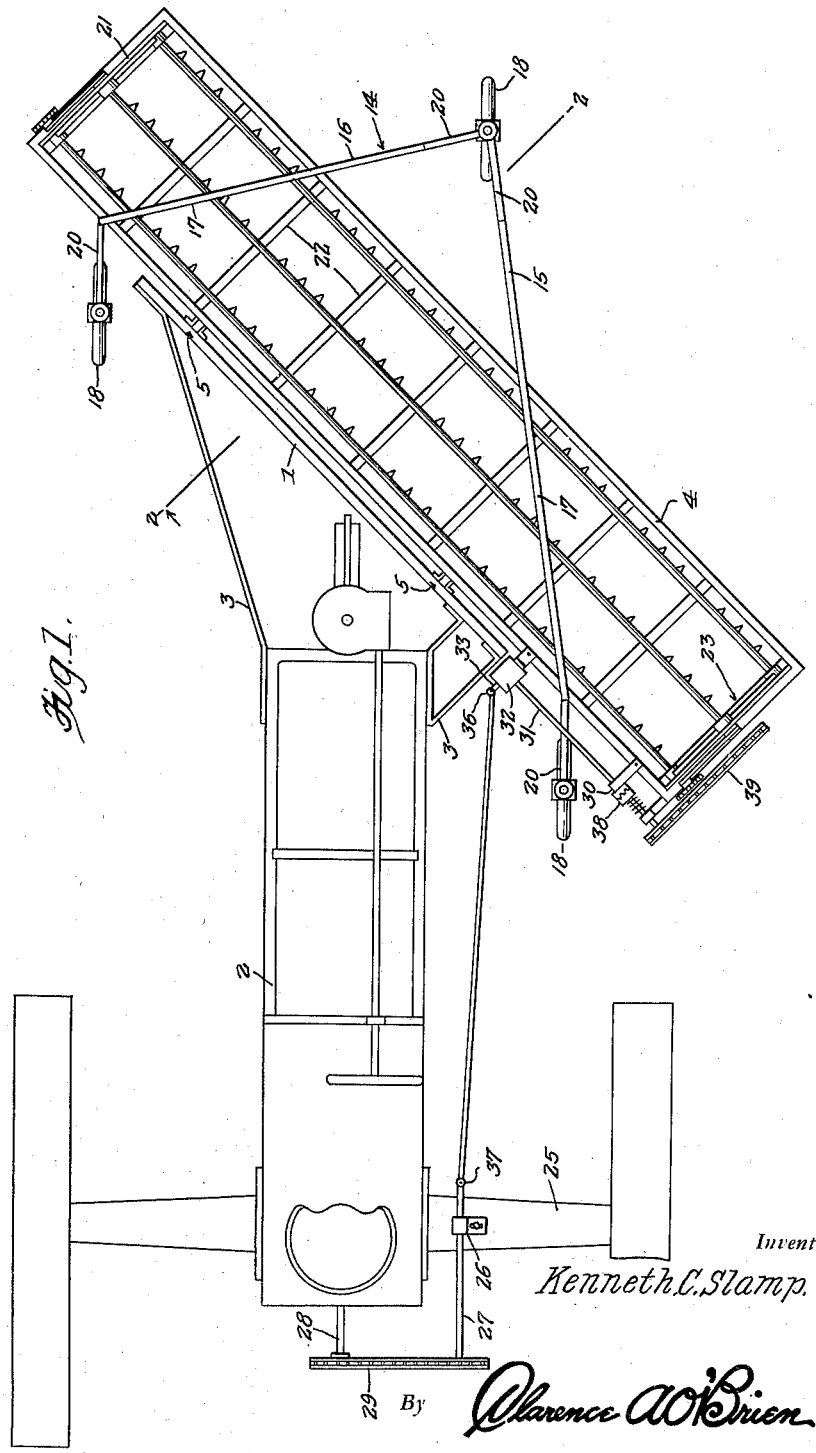
Figure 1 is a top plan view, showing a rake constructed in accordance with the present invention mounted in position on the front of a tractor.
Figure 2:
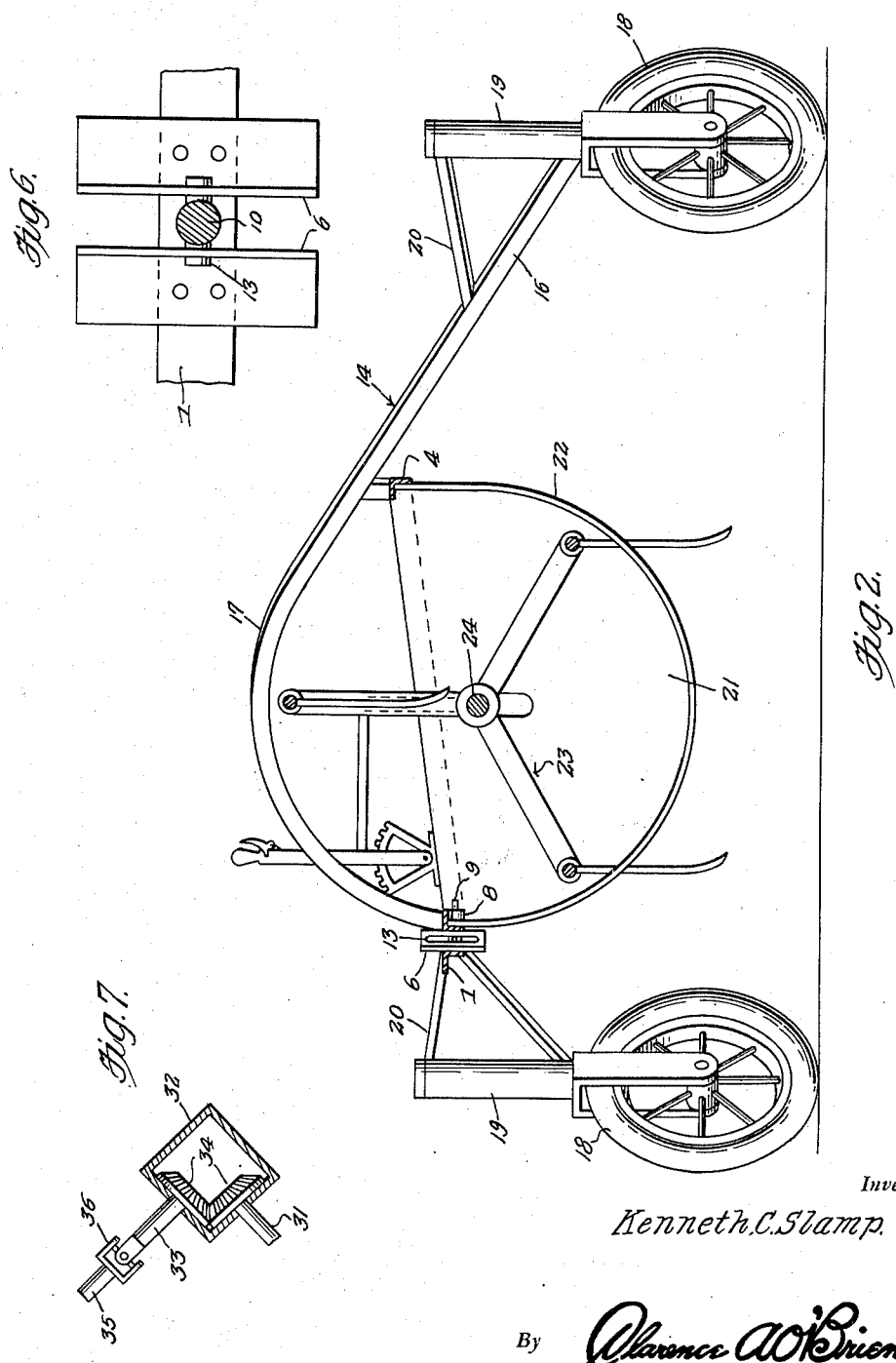
Figure 2 is a vertical sectional view through the rake, taken substantially on the line 2—2 of Figure 1.

Referring now to the drawings in detail, it will be seen that the embodiment of the invention which has been illustrated comprises a horizontal bar 1 which is mounted diagonally on the front of a tractor 2 through the medium of angular arms or brackets 3 of suitable metal. Mounted on the bar 1 and extending parallel therewith is an elongated, rectangular frame 4 of angle iron.

The frame 4 is floatingly mounted on the bar 1 through the medium of connections which are designated generally by reference numeral 5. The connections 5 comprise pairs of vertical angle iron brackets 6 which are fixed on the bar 1. The opposed flanges of the brackets 6 have formed therein vertical slots 7. Mounted beneath the adjacent member of the frame 4 are bearings 8. The bearings 8 are for the reception of the reduced portions 9 of pins 10 which extend between the brackets 6. Openings 11 in the adjacent member of the frame 4 accommodate the portions 9 of the pins 10, said openings 11 being aligned with the bearings 8. Collars 12 on the pins 10 abut the frame 4. Extending through the pins 10 are crossheads 13 which are operable in the slots 7, thus connecting the frame 4 to the brackets 6 for vertical movement. Cotter pins 14 retain the pins 10 in the bearings 8.

The frame 4 is supported from the ground by means including a frame 14 which, as illustrated to advantage in Figure 1 of the drawings, is substantially V-shaped in plan. The frame 14 includes comparatively long and short metallic members 15 and 16, respectively, each including an arcuate rear portion 17 which extends over the frame 4. Rubber tired caster wheels 18 are provided on the ends and the intermediate portions of the frame 14 for supporting said frame.

The tubular housings 19 in which the caster wheels 18 swivel are provided with suitable braces 20.

Substantially segmental plates 21 depend from the end portions of the elongated frame 4. Also depending from the frame 4, at spaced points, are arcuate metallic bars 22. A rotary rake 23 is mounted for vertical adjustment in the frame structure 4. The rake 23 includes a rotary shaft 24.

Mounted on the rear axle housing 25 of the tractor 2 is a bearing 26 in which a shaft 27 is journaled. The shaft 27 is driven from the power take-off shaft 28 of the tractor 2 through a chain and sprocket connection 29. The bearing 26 is adjustable on the axle housing 25 to permit regulation of the chain drive 29.

Journaled in suitable bearings 30 which are provided therefor on the rear portion of the frame 4 is a shaft 31. Also mounted on the rear portion of the frame 4 is a housing 32. Journaled in the housing 32 is a stub shaft 33. One end of the shaft 31 extends into the housing 32 and is operatively connected to the stub shaft 33 by beveled gears 34 (see Figure 7). The stub shaft 33 is connected to one end of a shaft 35 by a universal joint 36. The other end of the shaft 35 is connected to the shaft 27 by a universal joint 37.

Figure 3:
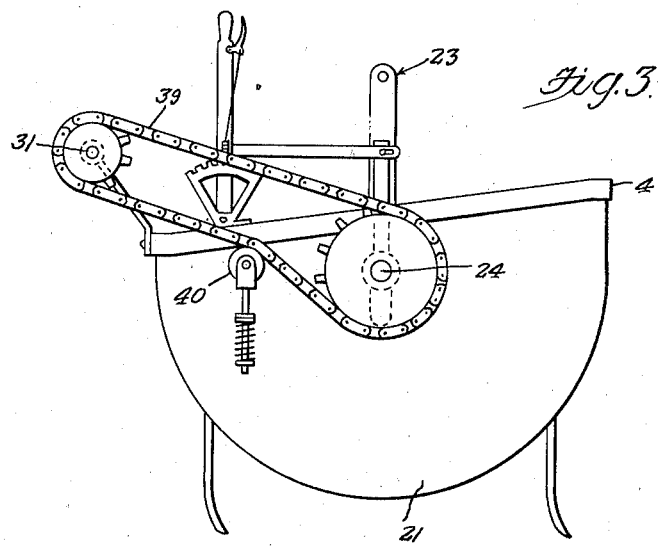
Figure 3 is a view in side elevation of the rake with the supporting structure omitted.
Figure 4:
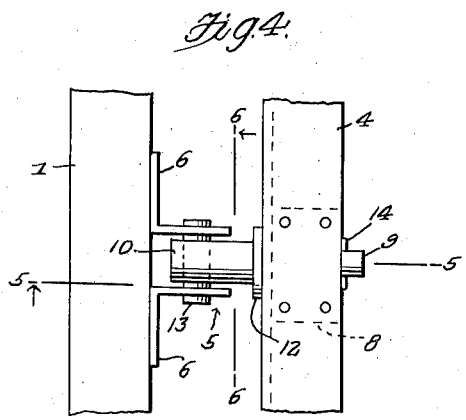
Figure 4 is a detail view in top plan of one of the connections between the rake frame and the tractor bumper.
Figure 5:
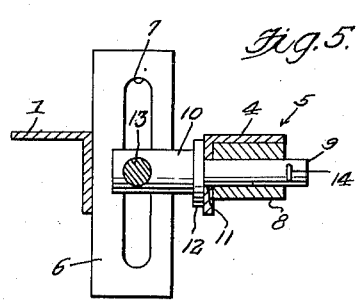
Figure 5 is a vertical sectional view, taken substantially on the line 5—5 of Figure 4.
Figure 8:
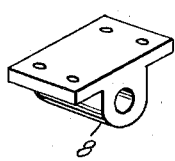
Figure 8 is a detail view in perspective of the bearing constituting a part of each of the connections shown in Figures 4, 5 and 6.

The shaft 31 has interposed therein an overload release clutch 38. The shaft 24 of the rake 23 is driven from the shaft 31 through a chain and sprocket connection 39. A suitable tightener 40 (see Figure 3) is provided for the chain drive 39.

It is thought that the operation of the apparatus will be readily apparent from a consideration of the foregoing. Of course, the rake is pushed forwardly by the tractor 2, said rake being supported by the frame structure 14 and the rubber tired wheels 18. The connections 5 permit the rake to move vertically relative to the tractor 2 while traveling over irregularities. The rotary rake 23 may be disconnected from the power plant of the tractor when desired through the medium of the usual lever which controls the power take-off of said tractor.

It is believed that the many advantages of a side delivery rake constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

Having described the invention, what is claimed as new is:

A hay rake of the character described comprising a bar, means for mounting said bar diagonally on the front of a tractor, pairs of angle iron brackets mounted vertically on the bar, said brackets having vertical slots therein, a frame of angle iron paralleling the bar, bearings secured beneath said frame, pins mounted on the frame and including reduced portions secured in said bearings, said pins projecting between the pairs of brackets, crossheads on the pins operable in the slots for connecting the pins to the brackets for vertical sliding movement and a rake rotatably mounted in the frame.

KENNETH C. SLAMP.